United States Patent [19]
Kota et al.

[11] Patent Number: 5,423,726
[45] Date of Patent: Jun. 13, 1995

[54] DIFFERENTIAL DRIVE WITH N OUTPUTS.

[75] Inventors: Sridhar Kota, Brighton; Srinivas R. Bidare, Ann Arbor, both of Mich.

[73] Assignee: Aeromover Systems Corporation, Dexter, Mich.

[21] Appl. No.: 97,832

[22] Filed: Jul. 26, 1993

Related U.S. Application Data

[63] Continuation-in-part of Ser. No. 793,516, Nov. 18, 1991, abandoned.

[51] Int. Cl.$^6$ .......................... F16H 3/58; F16H 3/64
[52] U.S. Cl. .................................. 475/206; 475/221; 74/665 G
[58] Field of Search ............... 475/204, 206, 219, 221, 475/230, 248, 332; 74/665 F, 665 G

[56] References Cited

U.S. PATENT DOCUMENTS

| | | | |
|---|---|---|---|
| 1,468,338 | 9/1923 | Wyman | 475/221 |
| 1,686,431 | 10/1928 | Wyman | 475/221 |
| 2,828,650 | 4/1958 | Hutter et al. | 475/221 |
| 2,832,233 | 4/1958 | Allgaier et al. | 475/221 |
| 4,856,372 | 8/1989 | Williamson | 475/206 |
| 5,176,589 | 1/1993 | Borgudd | 475/221 |

FOREIGN PATENT DOCUMENTS

| | | | |
|---|---|---|---|
| 439189 | 1/1927 | Germany | 475/221 |
| 257837 | 9/1926 | United Kingdom | 475/204 |

Primary Examiner—Dirk Wright
Assistant Examiner—Khoi Q. Ta
Attorney, Agent, or Firm—Rohm & Monsanto

[57] ABSTRACT

A plural output differential drive system provides plural outputs that are differentially related to each other. Four or more output shafts are driven from a single input shaft, each output shaft being differentially linked with the other output shafts. The entire differential drive arrangement may be expanded to any number of outputs, and is contained within a single housing. The output shafts of the plural output differential will transfer power in applications wherein a predetermined distribution of torque is required at four or more outputs, irrespective of their speeds. All the outputs are coupled as a series of all epicyclic differentiating mechanisms, or a series of epicyclic and bevel differentiating mechanisms. N outputs are achieved by introducing multiple epicyclic gear mechanisms. The input shaft may be arranged to be coaxial with the output shafts, or may be at any other angle, including orthogonal thereto. Typical applications include powering four or more live axles on vehicles, providing rotary power for developing equal or predeterminably proportional torques for simultaneously tightening multiple bolts, and generating equal forces on the gripper fingers of robotic hands. In addition, the outputs can be applied to leveling devices where four or more legs must apply equal pressures on a surface.

19 Claims, 5 Drawing Sheets

DIFFERENTIAL DRIVE WITH N OUTPUTS.

RELATIONSHIP TO OTHER APPLICATION

This application is a continuation-in-part of U.S. Ser. No. 07/793,516, filed Nov. 18, 1991, now abandoned, the disclosure of which is incorporated herein by reference.

BACKGROUND OF THE INVENTION

1. Field of the Invention

This invention relates to differential drive mechanisms, and more particularly, to a mechanical drive mechanism that has plural differentially related outputs responsive to a single rotatory input which causes rotation of four or more rotary outputs that are differentially related, whereby the rotary outputs rotate simultaneously until resistance is encountered on one or more of the rotary outputs causing same to stop rotating until the unloaded outputs encounter resistance, and such rotary outputs will continue to rotate until all of the outputs develop equal torque.

2. Description of the Related Art

A differential drive arrangement is commonly used in a vehicular application. This is a device that divides the input torque from the propeller shaft equally between two output shafts to the drive wheels. Such division occurs irrespectively of whether the drive wheels of the vehicle are rotating at different speeds. Such a speed differential will occur, for instance, on rounding a corner. In applications where the differential divides the input torque equally among the elements that are being subjected to torque, the division occurs independently of the speeds at which they are rotating.

Conventional differential gearing mechanisms have a single input shaft with a pinion gear attached thereto that drives a crown gear fixed to a carrier or cage that contains a set of spider gears or other differentiating mechanism by which two outputs may be derived. If more than two outputs are required, a second differential system in a separate housing is required to be connected in tandem with the first. To maintain an equal distribution of torque at all final outputs, all such differential systems must be assembled such that the two outputs of a primary differential arrangement drives the inputs of two other secondary differential arrangements. As demonstrable mathematically, such an arrangement of differentials results in the total number of outputs being equal to $2^n$, i.e., 2, 4, 8, 16, etc. Any other combination of differentials will not yield equal torque outputs.

A standard differential that can develop equal torques will have both bevel gears of same size, and the bevel pinions of equal size as well. In the current state of the art, the provision of four differentially related outputs, as required in a four-wheel-drive vehicle, will require the use of three standard differentials that will be contained in separate but connected casings.

There is a need in the art for a series connection of differential mechanisms that will provide odd or even numbers of outputs, all such outputs being differentially related to each other. There is additionally a need for a multi-output differential drive arrangement that provides equal torques at all outputs irrespective of output speeds.

It is believed that there are no methods or arrangements in the art that provide multiple outputs, e.g., four or more outputs from a single integrated differential mechanism enclosed in a single housing, and that will provide equal or predeterminably unequal torques at all outputs irrespective of the speeds of the output shafts.

It is therefore an object of this invention to provide a system for providing differential action in which four or more differentially related outputs may be derived from a single input.

It is also an object of this invention to provide a differential drive arrangement in which the number of differentially related outputs from a single input is not limited.

It is another object of this invention to provide a multi-output differential drive arrangement that can easily and simply be controlled from a single input.

It is still another object of this invention to provide an arrangement that can easily and simply be designed to provide any number of differentially related outputs from a single input, the arrangement being contained within a single housing, to reduce the size and expense of the arrangement, while simultaneously simplifying placement of the arrangement in various applications.

It is yet another object of this invention to provide differentially geared linear motion as may be required for pressure sensitive leveling operation against uneven and variable density surfaces and providing such capability using only one load sensing device.

It is additionally an object of this invention to provide differentially distributed torque among four or more outputs as may be required in simultaneous tightening of bolts and providing such capability using only one load sensing device.

It is a further object of this invention to provide differentially geared motion to four or more outputs such as, but not limited to, actuation of machine or robotic gripper fingers.

It is still another object of this invention to provide a system of differentially geared outputs to concentric output shafts from a single input shaft through a plural output differential such as may be applied to, but not limited to, multiple output drives in vehicle applications.

A still further object of this invention is to increase power transmission efficiency and durability while reducing in the cost of manufacturing and maintenance.

An additional object of this invention is to eliminate the need for multiple differential housings when providing four or more differential outputs.

Yet another object of this invention is to reduce the number of components required to construct a single differential drive system that provides four or more outputs.

SUMMARY OF THE INVENTION

The foregoing and other objects are achieved by this invention which provides a plural output differential enclosed in a single housing that provides specific division of torque from a single input to three or more outputs such that all the outputs are differentially related. This invention includes within its scope a combination of one or more epicyclic geared differentiating mechanisms which, in certain embodiments, may be arranged in series with a bevel-geared differentiating mechanism. Each epicyclic differentiating mechanism consists of a sun gear meshing with one or more planet gears which in turn mesh with a ring gear. Each of the epicyclic geared differentiating mechanism constitutes a stage, and two or more stages are connected to derive multiple outputs such that the output from the ring gear of a previous stage is connected to the planet gear carrying arm of the next stage. The rotatory input is provided at the planet gear carrying arm of the first stage, which; as previously stated, is an epicyclic geared differentiating mechanism. In one embodiment of the n output differential there are n−1 stages of which the first n−2 stages are epicyclic geared differentiating mechanisms. The last stage is a bevel geared differentiating mechanism that is structurally composed of two planet bevel gears meshing with two sun planet gears, all housed in a primary carrier. The outputs are derived from the bevel sun gears. The ring gear of the last epicyclic gear differentiating mechanism is rigidly connected to the primary carrier of the last stage or bevel gear differentiating mechanism. The serial interconnection of two or more epicyclic gear differentiating mechanisms with one bevel gear differentiating mechanism provides equal torque distribution to any number of outputs. However, in some embodiments of the invention, the gear ratios can be modified to obtain unequal torque distributions as desired. The identification of specific ratios for specific applications is within the ability of a person of ordinary skill in the art, in light of the teaching in this disclosure.

In accordance with the invention, there is provided a differential drive arrangement of the type having an input for receiving a rotatory input drive. The arrangement has four outputs, each for producing a respective rotary output drive in response to the rotatory input drive. The differential drive arrangement is provided with a first planetary carrier for receiving the rotatory input drive, a plurality of first planetary gears coupled to the planetary carrier, each of the first planetary gears being rotatable in a plane of rotation, and a first sun gear for meshing with the first planetary gears, the first sun gear being rotatable in a plane of rotation that is parallel to that of the first planetary gears. A first output shaft for providing a first one of the rotary output drives is coupled to the first sun gear and is rotatable about an axis that is orthogonal to the plane of rotation of the first sun gear. In addition, a first ring gear meshes with the first planetary gears, and is arranged to rotate coaxially with the first sun gear. A second carrier is fixedly coupled to the first ring gear, and a plurality of secondary planetary gears is coupled thereto whereby each of the secondary planetary gears is rotatable in a plane of rotation that is parallel to that of the first planetary gears. A second sun gear is arranged to mesh with the plurality of secondary planetary gears, and is rotatable in a plane of rotation that is parallel to that of the secondary planetary gears. A second output shaft for provides a second one of the rotary output drives and is coupled to the second sun gear, which is rotatable about an axis that is orthogonal to the plane of rotation of the second sun gear. Further in accordance with this aspect of the invention, a second ring gear meshes with the second planetary gears, the second ring gear being arranged to rotate coaxially with the second sun gear. A first bevel sun gear is arranged concentrically with the first output shaft and rotates in a plane of rotation that is orthogonal to the axis of the first output shaft. A third output shaft provides a third one of the rotary output drives, the third output shaft being coupled to the first bevel sun gear. A second bevel sun gear is arranged concentrically with the first output shaft and rotates in a plane of rotation that is parallel to that of the first bevel sun gear. A fourth output shaft provides a fourth one of the rotary output drives, the fourth output shaft being coupled to the second bevel sun gear. A planetary bevel gear is arranged to mesh with the first and second sun bevel gears, and rotates in a plane of rotation that is orthogonal to the planes of rotation of the first and second bevel sun gears. Finally, a carrier arrangement is provided affixed to the second ring gear for rotating therewith. The carrier arrangement is also coupled to the planetary bevel gear that is angularly displaceable about the axis of rotation of the first output shaft in response to the rotation of the second ring gear.

In one embodiment of this aspect of the invention, the differential drive arrangement is further provided an input shaft for providing the rotatory input drive. A single cavity housing is provided having a first end for receiving the input shaft and a second end for accommodating the first, second, third, and fourth output shafts, the first, second, third, and fourth output shafts are concentric with respect to one another. It should be noted that the invention is not limited to rotary motion. In certain embodiments, a translation arrangement converts a rotating motion of at least one of the output shafts into a linear motion.

In a four output aspect of the invention, the differential drive arrangement is provided with a first planetary carrier for receiving the rotatory input drive, a plurality of first planetary gears coupled to the planetary carrier, each of the first planetary gears being rotatable in a plane of rotation, and a first sun gear for meshing with the first planetary gears, the first sun gear being rotatable in a plane of rotation that is parallel to that of the first planetary gears. A first output shaft provides a first one of the rotary output drives. The first output shaft is coupled to the first sun gear, and is rotatable about an axis that is coaxial with the rotatory input drive and orthogonal to the plane of rotation of the first sun gear. A first ring gear is arranged to mesh with the first planetary gears, the first ring gear being arranged to rotate coaxially with the first sun gear. A second carrier is fixedly coupled to the first ring gear. A plurality of secondary planetary gears is coupled to the secondary carrier, each of the secondary planetary gears is rotatable in a plane of rotation that is parallel to that of the first planetary gears. There is further provided a second sun gear that meshes with the plurality of secondary planetary gears, the secondary sun gear being rotatable in a plane of rotation that is parallel to that of the secondary planetary gears. A second output shaft provides a second one of the rotary output drives. The second output shaft is coupled to the second sun gear, and is rotatable about an axis that is coaxial with the rotatory input drive and orthogonal to the plane of rotation of the second sun gear. A second ring gear meshes with the second planetary gears, the second ring gear being arranged to rotate coaxially with the second sun gear. A first bevel sun gear is concentrically arranged with the first output shaft and rotates in a plane of rotation that is orthogonal to the axis of the first output shaft. A third output shaft provides a third one of the rotary output drives. The third output shaft is coupled to the first bevel sun gear. A second bevel sun gear is arranged concentrically with the first output shaft and rotates in a plane of rotation parallel to that of the first bevel sun gear. A fourth output shaft provides a fourth one of the rotary output drives, and is coupled to the second bevel sun gear. A planetary bevel gear is arranged to mesh with the first and second sun bevel gears. The planetary bevel gear is arranged to rotate in a plane of rotation that is orthogonal to the planes of rotation of the first and second bevel sun gears. There is also provided a carrier member affixed to the second ring gear for rotating therewith. The carrier member is further coupled to the planetary bevel gear. The planetary bevel gears being angularly displaceable about the axis of rotation of the first output shaft in response to the rotation of the second ring gear.

In one embodiment of this aspect of the invention, there is further provided a single cavity housing having a first end for receiving the input drive and a second end for accommodating the first, second, third, and fourth output shafts. In some embodiments, the output shafts are coaxial with the rotatory input drive. In further embodiments, the first, second, third, and fourth output shafts are concentric with respect to one another.

In accordance with a still further aspect of the invention, a differential drive arrangement is provided having a rotary input and n differentially related outputs, where $n \geq 4$. The differential drive arrangement has $n-2$ epicyclic planetary gear modules each having: a sun gear, a ring gear, at least one planetary gear meshing with the sun and ring gears, and a planetary carrier for supporting the planetary gear. There is additionally provided an input coupler for coupling to the planetary carrier of a first one of the $n-2$ epicyclic planetary gear modules and forming the rotary input, and n-3 intermodule couplers for interconnecting the $n-2$ epicyclic planetary gear modules sequentially. The epicyclic planetary gear modules are coupled at a ring gear of a prior epicyclic planetary gear module to a planetary gear of a subsequent epicyclic planetary gear module. A bevel-meshing planetary gear system is provided having first and second bevel-meshing sun gears arranged concentrically and in parallel with respect to one another, and at least one bevel-meshing planetary gear arranged to mesh with the first and second bevel-meshing sun gears. A carrier coupler couples with the bevel-meshing planetary gear. The carrier coupler is fixedly coupled to the ring gear of the planar-meshing planetary gear system so as to be rotatable therewith. In addition, a plurality of output shafts are arranged concentrically with respect to one another, each of the output shafts being coupled to a respective one of the sun gear and the first and second bevel-meshing sun gears.

In accordance with a still further aspect of the invention, a plural output differential of the type having a single input shaft, the plural output differential is provided with at least three differentially related output shafts, a single housing for substantially enclosing the plural output differential, and at least two carrier arms disposed within the housing and coupled to the single input shaft. There is also provided a first epicyclic gear train stage having at least two planet gears mounted on the carrier arms, a sun gear for meshing with the planet gears; the sun gear having internal splines, a first output shaft engaged with the internal splines of the sun gear and extending out of the single housing, the first output shaft being arranged to be coaxial with the single input shaft, and a ring gear for meshing with the planet gears. A carrier arrangement is rigidly attached to a the ring gear. The carrier arrangement is freely rotatable about the first output shaft and being mounted on the housing supported on a bearing. Two bevel planet gears are contained within the carrier arrangement at diametrically opposite ends thereof and are rotatable about an axis that is orthogonal to that of the first output shaft. A bearing support cage rotatably supports the two bevel planet gears that also are internally mounted on the bearing support cage. The bearing support cage is hollow in the direction of the first output shaft to allow the first output shaft to pass therethrough. First and second bevel sun gears are provided for meshing with the two bevel planet gears and are arranged to be rotatable about the axis of rotation of the first output shaft. The first and second bevel sun gears being internally splined. Second and third output shafts are provided, the second output shaft being engaged with the internal splines of the first bevel sun gear, and the third output shaft being engaged with the internal splines of the second bevel sun gear. The first, second, and third output shafts are arranged to be mutually concentric.

There is provided, in a specific embodiment and application of the invention, a translation arrangement for converting a rotary motion of one of the output shafts into a linear motion. Such a translation arrangement can be configured within the capability of a person having ordinary skill in the art, and will find significant utility in embodiments where there is a need to apply equal or otherwise predetermined ratios of leveling forces.

In accordance with an aspect of the invention which is particularly suited for a vehicular application, a plural output differential arrangement is provided, the arrangement being of the type having an input shaft. The arrangement is provided with a first epicyclic gear train stage having a first carrier arm, a first planet gear mounted on the carrier arm, a first sun gear for meshing with the first planet gear, the first sun gear having internal splines, a first output shaft engaged with the internal splines of the first sun gear, and a first ring gear for meshing with the first planet gear. The input shaft is coupled to the first carrier arm. A second epicyclic gear train stage is provided having a second carrier arm, a second planet gear mounted on the carrier arm, a second sun gear for meshing with the second planet gear, the second sun gear having internal splines, a second output shaft engaged with the internal splines of the second sun gear, and a second ring gear for meshing with the second planet gear. There is additionally provided a further coupler for coupling the first ring gear to the second carrier arm. A third output shaft coupled to the second ring gear. Additionally, a carrier arrangement is arranged to rotate in response to the third output shaft. There is additionally provided a bevel-meshing differential drive arrangement that is rigidly coupled to the carrier arrangement. The bevel-meshing differential drive arrangement has first and second bevel planet gears contained within the carrier arrangement at diametrically opposite ends thereof and further being revolvable in response to the rotation of the carrier arrangement about an axis that is orthogonal to that of the first output shaft, first and second bevel sun gears each for meshing with the first and second bevel planet gears and arranged to be rotatable about an axis of rotation that is coaxial with that of the rotation of the carrier arrangement, and fourth and fifth output shafts engaged with respective ones of the first and second bevel sun gears. In addition, there is provided a coupler shaft for coupling the third output shaft and the carrier arrangement.

In one embodiment of this aspect of the invention, there are further provided a first housing for accommodating the first and second epicyclic gear train stages, and a second housing for accommodating the bevel-meshing differential drive arrangement. The first housing is arranged to form first and second cavities substantially isolated from one another for accommodating respective ones of the first and second epicyclic gear train stages, there being further provided a bearing disposed intermediate of the first and second epicyclic gear train stages. In a still further embodiment, the first housing is arranged to form a third cavity for accommodating a meshed gear arrangement whereby the third output shaft is coupled to the coupler shaft.

In a further aspect of the invention, a differential drive arrangement has a rotatory input and n differentially related outputs, where $n \geq 2$. The differential drive arrangement has n epicyclic planetary gear modules each having a sun gear, a ring gear, at least one planetary gear meshing with the sun and ring gears, and a planetary carrier for supporting the planetary gear. An input coupler couples to the planetary carrier of a first one of the n epicyclic planetary gear modules and provides the rotatory input. There are provided $n-1$ inter-module couplers for interconnecting the n epicyclic planetary gear modules sequentially, the epicyclic planetary gear modules being coupled at a ring gear of a prior epicyclic planetary gear module to a planetary gear of a subsequent epicyclic planetary gear module. In addition, n output shafts are arranged concentrically with respect to one another, the output shafts each being respectively coupled to the sun gear of each of the epicyclic planetary gear modules.

In accordance with a still further aspect of the invention, a plural output differential arrangement is provided with first and second major bevel planet gears, first and second minor bevel planet gears, and a carrier for holding the major and minor bevel planet gears in rotatable axial alignment, the first and second major bevel planet gears being disposed on opposite ends of the carrier, and the first and second minor bevel planet gears being disposed intermediate of the major bevel planet gears. There are additionally provided first and second major bevel sun gears arranged to mesh with the first and second major bevel planet gears, as well as first and second minor bevel sun gears arranged coaxially with respective ones of the major bevel sun gears and to mesh with the first and second minor bevel planet gears. First and second minor output shafts, are each coupled to rotate with a respectively associated one of the first and second minor bevel sun gears. Also, first and second major output shafts are each coupled to rotate with a respectively associated one of the first and second major bevel sun gears. The first minor and first major output shafts are coaxial and extend in a first direction, and the second minor and second major output shafts are also coaxial and extend in a second direction. A coupler couples the rotatory input to the carrier for rotating the carrier in response to the rotatory input, the rotation of the carrier causing the major and minor bevel planet gears to revolve around the major and minor sun gears.

BRIEF DESCRIPTION OF THE DRAWING

Comprehension of the invention is facilitated by reading the following detailed description, in conjunction with the annexed drawing, in which.

DETAILED DESCRIPTION

Figure 1:
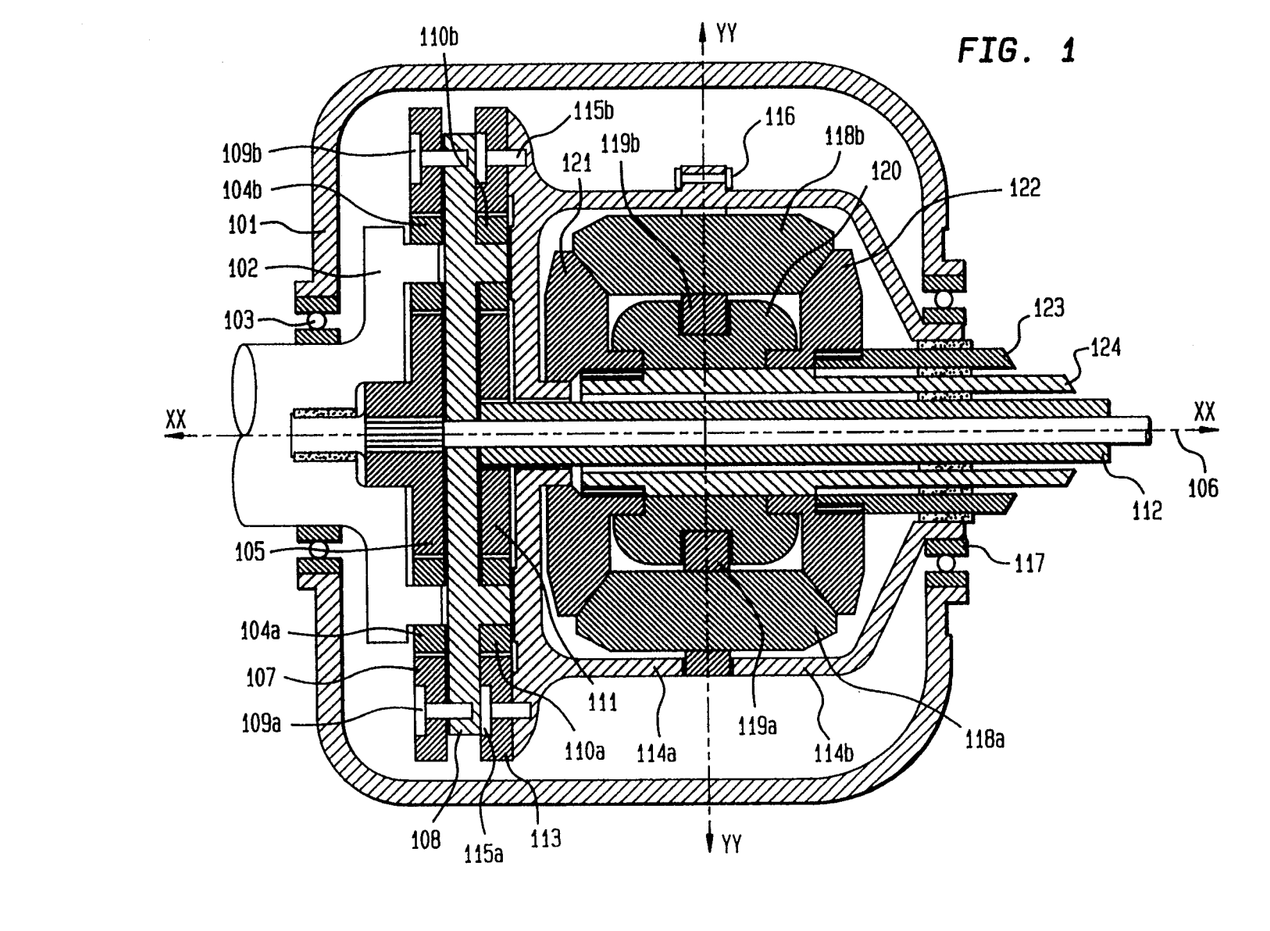
FIG. 1 is cross-sectional, plan representation of a four output differential contained within a single housing, and having four outputs that are concentric.

In FIG. 1, a rotatory input is provided to a first stage carrier arm 102. The first stage carrier arm is supported on a bearing 103 mounted on a housing 101, and is shown to support two first stage planet gears 104a and 104b. The first stage planet gears mesh with a first stage sun gear 105 that has internal splines (not specifically designated) to engage a first output shaft 106. The first output shaft extends out of the first stage sun gear and is housed, in this specific illustrative embodiment of the invention, at least partially in the first stage carrier arm. The first stage planet gears mesh with a first stage ring gear 107 which is mounted on a second stage carrier arm 108 supported on at least two bolts 109a and 109b.

The second stage carrier arm has at least two second stage planet gears 110a and 110b which mesh with a second stage sun gear 111. The second stage sun gear has internal splines (not shown) and engages a second output shaft 112 which extends out of the second stage sun gear and is concentric with first output shaft 106. The second stage planet gears mesh with a second stage ring gear 113 mounted on a third stage primary carrier 114a supported on at least two bolts 115a and 115b. The third stage primary carrier is rotatable about the second output shaft 112, and is rigidly connected to a third stage secondary carrier 114b by at least one bolt 116.

The third stage secondary carrier is supported on a bearing 117 mounted on the housing. The third stage primary carrier and the third stage secondary carrier together house at least two bevel planet gears 118a and 118b supported on two stub shafts 119a and 119b. Stub shafts 119a and 119b are rotatable about a YY axis and are internally mounted on a bearing support cage 120. In this embodiment, the bearing support cage is hollow along the XX axis.

The bevel planet gears mesh with two bevel sun gears 121 and 122 that are rotatable about the XX axis. Bevel sun gear 12 1 is internally splined and engages with a third output shaft 124. Bevel sun gear 122 is also internally splined and engages with a fourth output shaft 123. All four of the output shafts are rotatable about the XX axis and are concentric.

Figure 2:
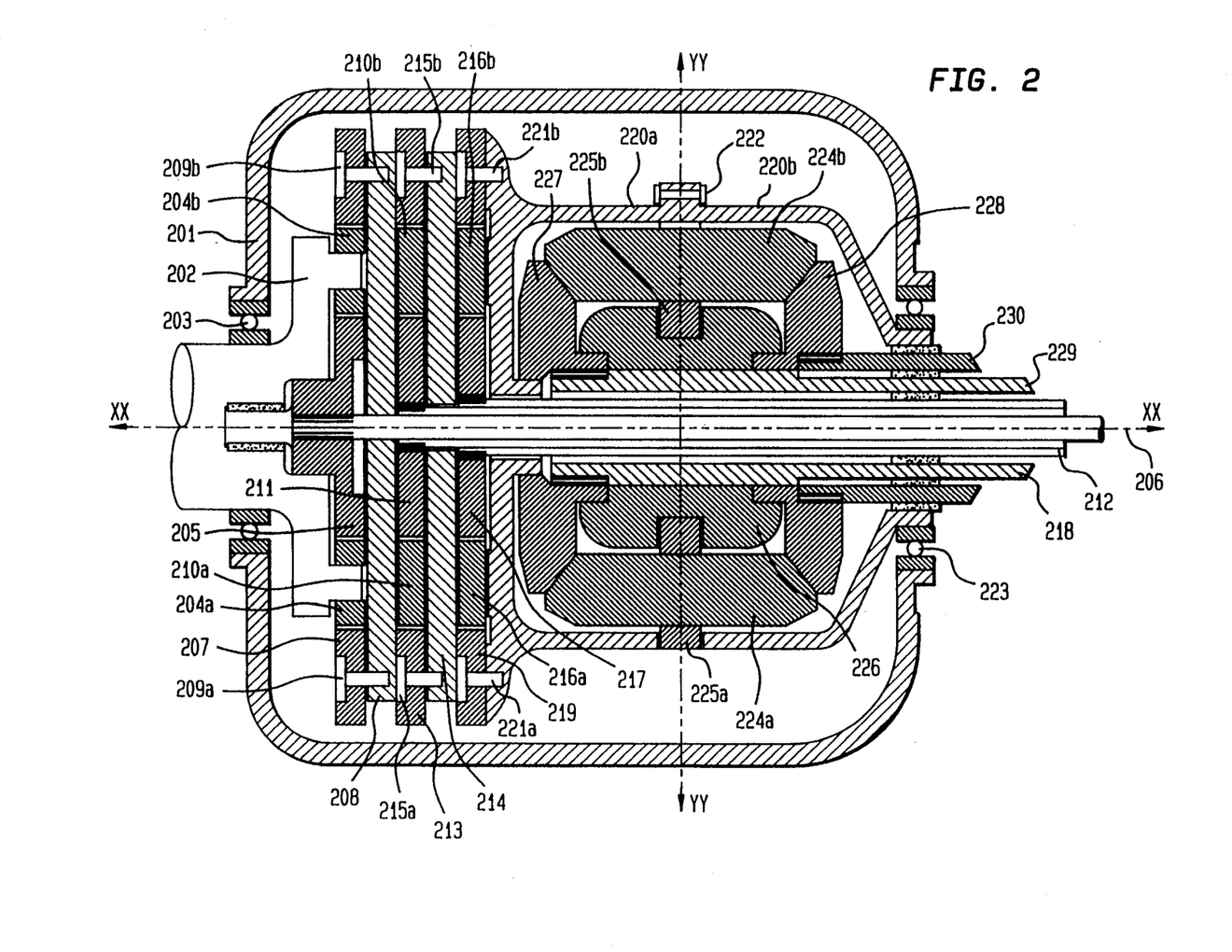
FIG. 2 is cross-sectional, plan representation of a five output differential housed in a single housing wherein the five outputs are concentric.

In FIG. 2, a rotatory input is provided to a first stage carrier arm 202 that is supported on a bearing 203 mounted on a housing 201. The first stage carrier arm has at least two first stage planet gears 204a and 204b. First stage planet gear 204a meshes with a first stage sun gear 205. The first stage sun gear has internal splines (not specifically designated) and engages with a first output shaft 206. The first output shaft extends out of the first stage sun gear and is housed, in this specific embodiment, partially within the first stage carrier arm. The first stage planet gears mesh also with a first stage ring gear 207 that is mounted on a second stage carrier arm 208 supported on at least two bolts 209a and 209b. The second stage carrier arm has at least two second stage planet gears 210a and 210b that mesh with a second stage sun gear 211 that has internal splines and engages second output shaft 212. Thus, second stage carrier arm 208 functions as an interstage coupler, coupling the ring gear of a prior epicyclic differential stage to the planet gears of a subsequent epicyclic differential stage. The second output shaft extends out of the second stage sun gear and is concentric with the first output shaft 206.

The second stage planet gears mesh with a second stage ring gear 213 that is mounted on a third stage carrier arm 214 supported on at least two bolts 215a and 215b. Third stage carrier arm 214 functions as an interstage coupler, as previously described. The third stage carrier arm has at least two third stage planet gears 216a and 216b that mesh with a third stage sun gear 217 having internal splines carrying a third output shaft 218. The third output shaft extends out of the third stage sun gear and is concentric with the first and second output shafts. The third stage planet gears mesh with a third stage ring gear 219 that is mounted on a fourth stage primary carrier 220a supported on at least two bolts 221a and 221b. The fourth stage primary carrier is rotatable about third output shaft 218 and is rigidly connected to a fourth stage secondary carrier 220b by at least one bolt 222. The fourth stage secondary carrier is supported on a bearing 223 mounted on the housing.

The fourth stage primary carrier and the fourth stage secondary carrier together house at least two bevel planet gears 224a and 224b supported on two stub shafts 225a and 225b that are rotatable about a YY axis and are internally mounted on a bearing support cage 226. The bearing support cage is hollow along the XX axis. The bevel planet gears mesh with two bevel sun gears 227 and 228 rotatable about the XX axis. Bevel sun gear 227 is internally splined and engages a fourth output shaft 229. Bevel sun gear 228 is also internally splined and engages a fourth output shaft 230. All four the output shafts are rotatable about the XX axis and are concentric.

Figure 3:
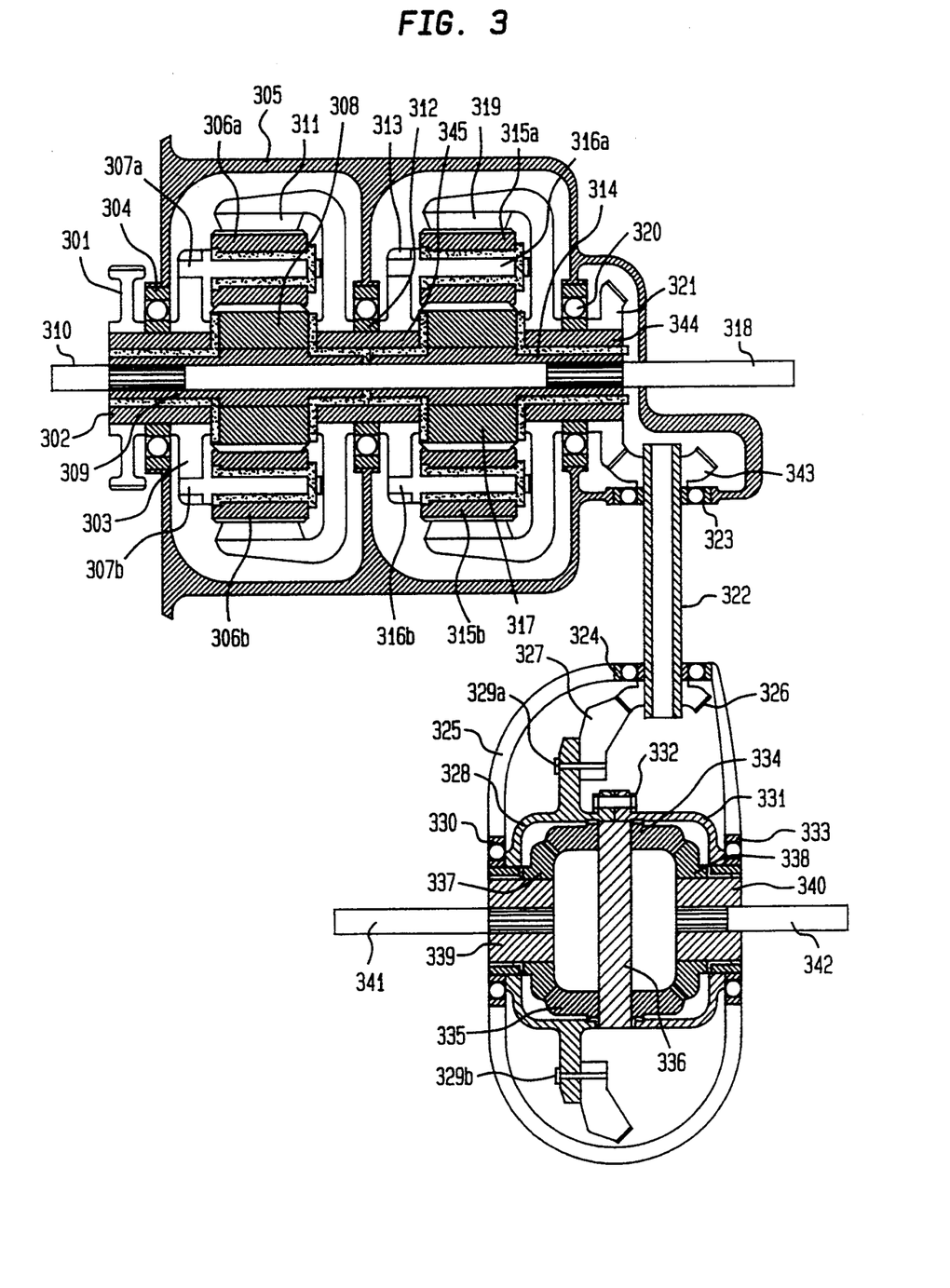
FIG. 3 is cross-sectional, plan representation of a four output differential housed in a split housing wherein the four outputs are parallel.

FIG. 3 is a schematic plan view of a differential drive arrangement which is housed in two housings, and is useful for driving the four wheels of a vehicle. In FIG. 3, a rotatory input is provided to an input shaft 301 which is rigidly mounted on a left transfer shaft 302. A first stage carrier arm 303 is rigidly mounted on the left transfer shaft and is supported on a bearing 304 mounted on a primary housing 305. The first stage carrier arm has at least two first stage planet gears 306a and 306b supported on pins 307a and 308b, the first stage planet gears being in mesh with a first stage sun gear 308. The first stage sun gear is rigidly mounted on a first output shaft 309 which has internal splines for engaging a left front wheel stub axle 310.

The first stage planet gears mesh with a first stage ring gear 311 which is rigidly mounted on a transfer shaft 345 supported on a bearing 312 mounted on the housing. The transfer shaft is concentric to and rotatable about the first output shaft. A second stage carrier arm 313 is rigidly mounted on the transfer shaft, the left transfer shaft is also concentric with, and rotatable about, a second output shaft 314. The second stage carrier arm has at least two second stage planet gears 315a and 315b supported on pins 316a and 316b, the second stage planet gears being in mesh with a second stage sun gear 317 which is rigidly mounted on the second output shaft. The second output shaft has internal splines and engages a right front wheel stub axle 318.

The second stage planet gears mesh with a second stage ring gear 319 which is rigidly mounted on a right transfer shaft and supported on a bearing 320 mounted on the primary housing. The right transfer shaft is concentric with, and rotatable about, the second output shaft.

The right transfer shaft is rigidly connected to a first bevel gear 321 that meshes with a first bevel planet pinion which is rigidly mounted on a power shaft 322. Power shaft 322 is rotatable, in this specific illustrative embodiment, about an axis orthogonal to the first and second output shafts, and is supported on a bearing 323 mounted on the primary housing and a bearing 324 on a secondary housing 325. The power shaft is rigidly connected to a second bevel pinion 326 that meshes with a second bevel gear 327 and is rigidly attached to a primary carrier 328 by at least two bolts 329a and 329b. The primary carrier is supported on a bearing 330 mounted on the secondary housing, and is rigidly attached to a secondary carrier 331 by at least one bolt 332. The secondary carrier is supported on a bearing 333 mounted on the secondary housing, the primary carrier and the secondary carrier being rotatable about an axis which in this specific illustrative embodiment is parallel to the first and second output shaft and orthogonal to the power shaft.

Two bevel planet pinions 334 and 335 are mounted on a support pin 336 housed in the primary and secondary carriers, and are rotatable about the axis of support pin 336. The two bevel planet pinions mesh with two bevel sun gears 337 and 338, bevel sun gear 337 being rigidly mounted on a third output shaft 339, and bevel sun gear 338 being rigidly mounted on a fourth output shaft 340. Third output shaft 339 is supported on a bearing (not specifically designated) mounted on the secondary housing and is spline connected to a left rear wheel stub axle 342, and the fourth output shaft is supported on a further bearing (not specifically designated) mounted on the secondary housing and is spline connected to a right rear wheel stub axle 344. The third and fourth output shafts are concentric and rotatable about an axis parallel to the first and second output shafts and orthogonal to the power shaft.

Figure 4:
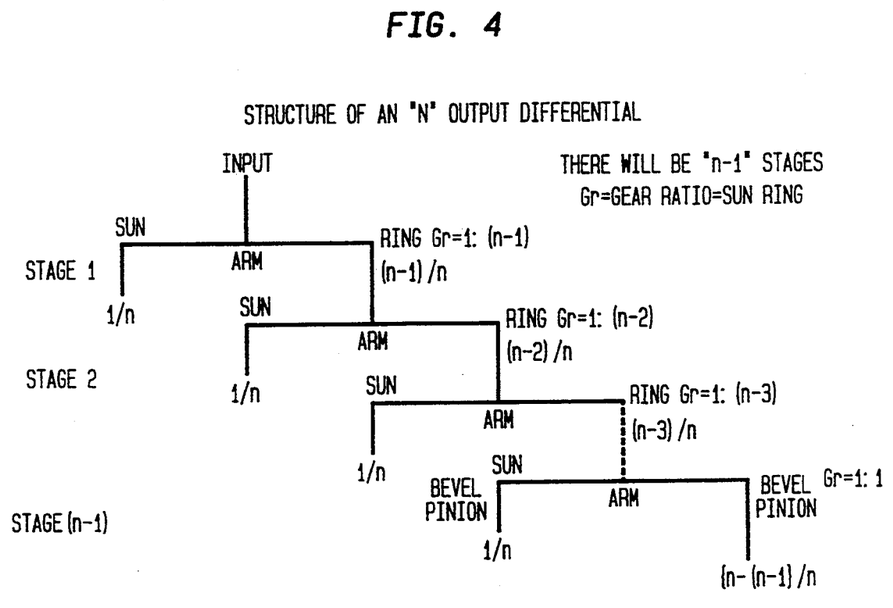
FIG. 4 is a schematic representation of the structure of an n output differential drive arrangement wherein a single input provides equal torque to all n outputs.

FIG. 4 is a schematic representation of a n output differential wherein the overall differential drive arrangement is formed of n−1 stages, the first n−1 stages being epicyclic gear differentiating mechanisms and the last stage being a bevel gear differentiating mechanism. The ring gear of each epicyclic gear differentiating mechanism is attached to the arm of the next stage epicyclic gear differentiating mechanism. The input is provided to the arm of the first stage epicyclic gear differentiating mechanism. The torque is split in the ratio of n:(n−1) in the first stage; the torque is split in the ratio of n:(n−2) in the second stage; and so on up to n:n in the last stage.

Figure 5:
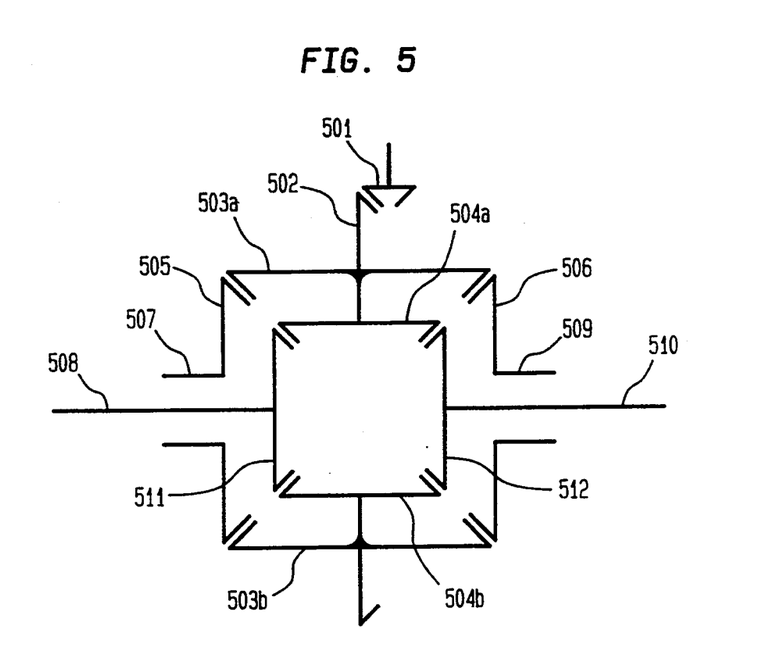
FIG. 5 is a schematic representation of a four output differential wherein a dual spider bevel gear arrangement is employed to provide two output pairs in opposite directions.

FIG. 5 is a schematic representation of four output truck differential wherein a rotatory input is provided to an input bevel pinion 501. The bevel pinion meshes with a crown gear 502 which is coupled to two bevel spider planet gears 503a and 504a. The two bevel spider planet gears are rigidly connected to each other and are freely rotatable about an axis parallel to the axis of the input bevel pinion. A pair of bevel spider planet gears 503b and 504b are functionally and structurally identical to bevel spider gears 503a and 504a. The two bevel spider planet gears 503a and 503b mesh with a left outer bevel sun gear 505 and a right outer bevel sun gear 506. The left outer bevel sun gear is rigidly attached to a left outer output shaft 507 and the right outer bevel sun gear is rigidly attached to right outer output shaft 509.

The two bevel spider planet gears 504a and 504b mesh with a left inner bevel sun gear 511 and a right inner bevel sun gear 512. The left inner bevel sun gear is rigidly attached to a left inner output shaft 508 and the right inner bevel sun gear is rigidly attached to a right inner output shaft 510. The left two outputs are concentric and the right two outputs are concentric. This differential drive arrangement is particularly useful in the application of large trucks which employ dual rear wheels on each side. In that application, each of the dual wheels will have a differential drive output coupled to it.

Figure 6:
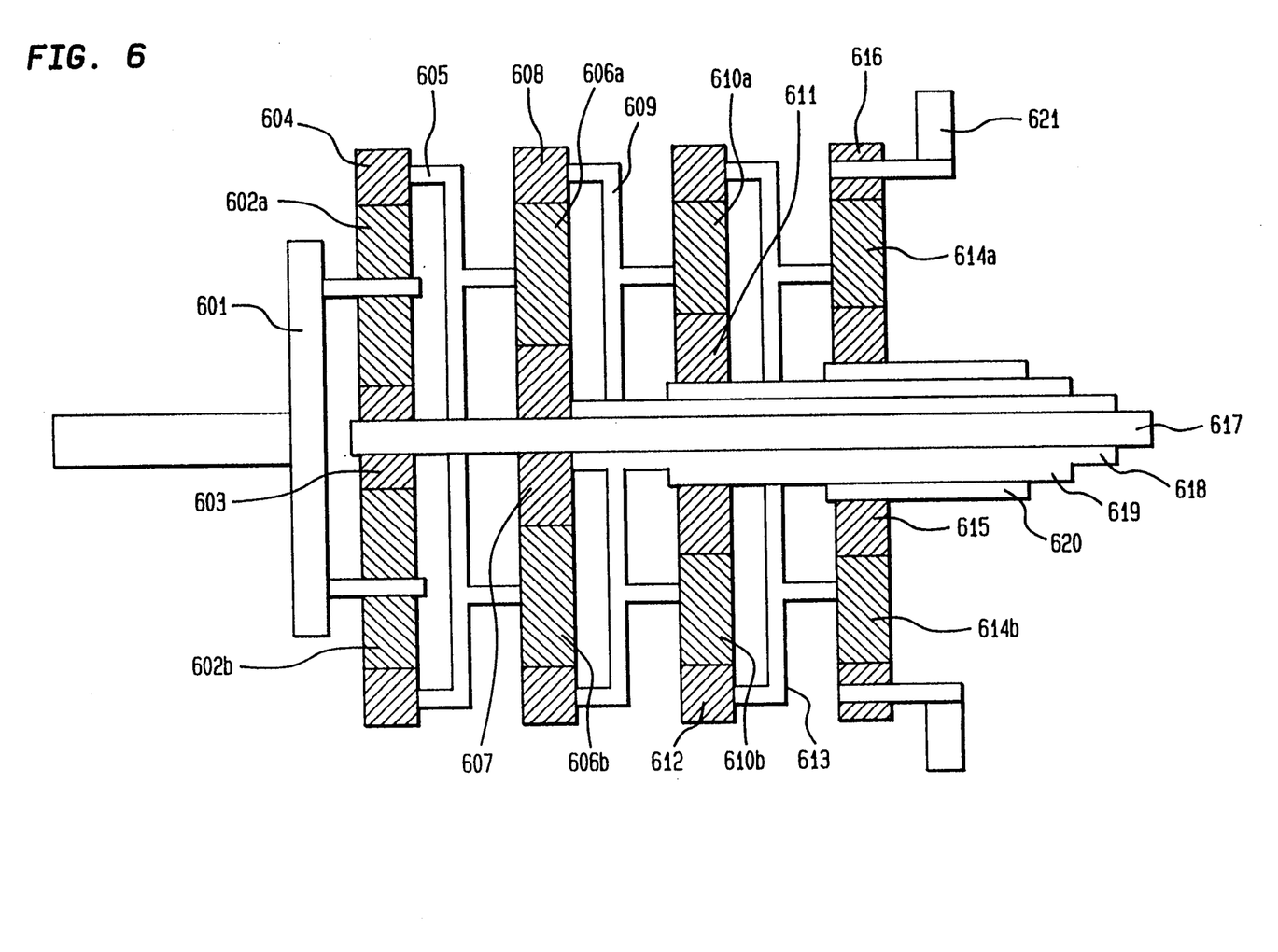
FIG. 6 is a schematic representation of a preferred embodiment of a five output differential wherein one of the outputs serves as a torque sensor and the four remaining outputs provide rotational power output.

FIG. 6 is a schematic representation of an embodiment of a five output differential. This embodiment is particularly useful in the application of a nut runner arrangement wherein four bolts, such as on a wheel, can simultaneously be tightened to a predetermined torque. The fifth output, as will be discussed hereinbelow, is coupled to a torque sensing device. A rotatory input is provided to a first stage carrier arm 601 having at least two first stage planet gears 602a and 602b. The first stage planet gears mesh with a first stage sun gear 603 that has internal splines (not shown) and carries a first output shaft 617 that extends out of the first stage sun gear and is housed in a the first stage ring gear 604. The ring gear is mounted on a second stage carrier arm 605 having at least two second stage planet gears 606a and 606b which mesh with a second stage sun gear 607. The second stage sun gear has internal splines and carries a second output shaft 618 that extends out of the second stage sun gear and is concentric with the first output shaft 617. The second stage planet gears mesh with a second stage ring gear 608 that is mounted on a third stage carrier arm 613.

At least two third stage planet gears 610a and 610b are provided on the third stage carrier arm. The third stage planet gears mesh with a third stage sun gear 611 having internal splines (not shown) for engaging a third output shaft 619 that extends out of the third stage sun gear and is concentric with the first and second output shafts. The third stage planet gears mesh with a third stage ring gear 612 mounted on a fourth stage carrier arm 613. The fourth stage carrier arm has at least two fourth stage planet tears 614a and 614b that mesh with a fourth stage sun gear 615 having internal splines (not shown) which engage a fourth output shaft 620. Fourth output shaft 620 extends out of the fourth stage sun gear and is concentric with the first, second, and third output shafts. The fourth stage planet gears mesh with a fourth stage ring gear 616 that is rigidly connected to a torque sensing device 621.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A differential drive arrangement of the type having an input for receiving a rotatory input drive, and four outputs, each for producing a respective rotary output drive in response to the rotatory input drive, the differential drive arrangement comprising:
   a first planetary carrier for receiving the rotatory input drive;
   a plurality of first planetary gears coupled to said planetary carrier, each of said first planetary gears being rotatable in a plane of rotation;
   a first sun gear for meshing with said first planetary gears, said first sun gear being rotatable in a plane of rotation that is parallel to that of said first planetary gears;
   a first output shaft for providing a first one of the rotary output drives, said first output shaft being coupled to said first sun gear, and being rotatable about an axis that is orthogonal to said plane of rotation of said first sun gear;
   a first ring gear for meshing with said first planetary gears, said first ring gear being arranged to rotate coaxially with said first sun gear;
   a second carrier fixedly coupled to said first ring gear;
   a plurality of secondary planetary gears coupled to said second carrier, each of said secondary planetary gears being rotatable in a plane of rotation that is parallel to that of said first planetary gears;
   a second sun gear for meshing with said plurality of secondary planetary gears, said secondary sun gear being rotatable in a plane of rotation that is parallel to that of said secondary planetary gears;
   a second output shaft for providing a second one of the rotary output drives, said second output shaft being coupled to said second sun gear, and being rotatable about an axis that is orthogonal to said plane of rotation of said second sun gear;
   a second ring gear for meshing with said second planetary gears, said second ring gear being arranged to rotate coaxially with said second sun gear;
   a first bevel sun gear arranged concentrically with said first output shaft and to rotate in a plane of rotation orthogonal to said axis of said first output shaft;
   a third output shaft for providing a third one of the rotary output drives, said third output shaft being coupled to said first bevel sun gear, and being coaxial with said first output shaft;
   a second bevel sun gear arranged concentrically with said first output shaft and to rotate in a plane of rotation parallel to that of said first bevel sun gear;
   a fourth output shaft for providing a fourth one of the rotary output drives, said fourth output shaft being coupled to said second bevel sun gear, and being coaxial with said first output shaft;
   a planetary bevel gear for meshing with said first and second sun bevel gears, said planetary bevel gear being arranged to rotate in a plane of rotation that is orthogonal to the planes of rotation of said first and second bevel sun gears; and
   carrier means affixed to said second ring gear for rotating therewith, said carrier means being further coupled to said planetary bevel gear, said planetary bevel gear being angularly displaceable about said axis of rotation of said first output shaft in response to the rotation of said second ring gear.

2. The differential drive arrangement of claim 1, wherein there is further provided an input shaft for providing the rotatory input drive.

3. The differential drive arrangement of claim 2, wherein there is further provided a single cavity housing having a first end for receiving said input shaft and a second end for accommodating said first, second, third, and fourth output shafts.

4. The differential drive arrangement of claim 1, wherein said first, second, third, and fourth output shafts are concentric with respect to one another.

5. The differential drive arrangement of claim 1, wherein there is further provided translation means for converting a rotating motion of one of said output shafts into a linear motion.

6. A differential drive arrangement for distributing a rotational mechanical energy to four rotary outputs, the differential drive arrangement being of the type having an input shaft for receiving a rotatory input, and at least four output shafts, each for producing a respective rotary output drive in response to the rotatory input, the differential drive arrangement comprising:
- a first planar-meshing planetary gear system having a first sun gear, a first ring gear, at least one first planetary gear meshing with said first sun and first ring gears, and a first planetary carrier for rotatably supporting said first planetary gear;
- input coupling means for coupling said first planetary carrier to the input shaft;
- a second planar-meshing planetary gear system having a second sun gear, a second ring gear, at least one second planetary gear meshing with said second sun and second ring gears, and a second planetary carrier for rotatably supporting said second planetary gear;
- a first gear system coupler for coupling said first ring gear to said second planetary carrier;
- a bevel-meshing planetary gear system having first and second bevel-meshing sun gears arranged coaxially and spaced in parallel with respect to one another, and at least one bevel-meshing planetary gear arranged to mesh with said first and second bevel-meshing sun gears;
- carrier coupler means for coupling with said bevel-meshing planetary gear, said carrier coupler means being fixedly coupled to said second ring gear of said second planar-meshing planetary gear system so as to be rotatable therewith; and
- the output shafts being arranged concentrically with respect to one another, each of said output shafts being coupled to a respective one of said sun gear and said first and second bevel-meshing sun gears.

7. The differential drive arrangement of claim 6, wherein said first gear system coupler and said third planetary carrier are integrally formed.

8. The differential drive arrangement of claim 7, wherein the differential drive arrangement is provided with a fifth output shaft, and there is further provided:
- a third planar-meshing planetary gear system arranged axially intermediate of said first and second planar-meshing planetary gear systems, said third planar-meshing planetary gear system having a third sun gear, a third ring gear, at least one third planetary gear meshing with said third sun and third ring gears, and a third planetary carrier for supporting said third planetary gear;
- a first gear system coupler for coupling said first ring gear and said third planetary carrier; and
- a second gear system coupler for coupling said third ring gear and said second planetary carrier.

9. The differential drive arrangement of claim 8, wherein said second gear system coupler and said third planetary carrier are integrally formed.

10. The differential drive arrangement of claim 6, wherein said first and second planar-meshing planetary gear trains each comprise an epicyclic gear system.

11. The differential drive arrangement of claim 6, wherein there is further provided a single cavity housing having a first end for receiving said input drive and a second end for accommodating said first, second, third, and fourth output shafts.

12. The differential drive arrangement of claim 10, wherein said first, second, third, and fourth output shafts are concentric with respect to one another.

13. A differential drive arrangement having a rotary input and n differentially related outputs, where n is an integer having a value $\geq 4$, the differential drive arrangement comprising:
- $n-2$ epicyclic planetary gear modules each having:
  - a sun gear,
  - a ring gear,
  - at least one planetary gear meshing with said sun and ring gears, and
  - a planetary carrier for supporting said planetary gear;
- input coupling means for coupling to said planetary carrier of a first one of said $n-2$ epicyclic planetary gear modules and forming the rotary input;
- $n-3$ intermodule couplers for interconnecting said $n-2$ epicyclic planetary gear modules sequentially, said epicyclic planetary gear modules being coupled at a ring gear of a prior epicyclic planetary gear module to a planetary gear of a subsequent epicyclic planetary gear module;
- a bevel-meshing planetary gear system having first and second bevel-meshing sun gears arranged concentrically and in parallel with respect to one another, and at least one bevel-meshing planetary gear arranged to mesh with said first and second bevel-meshing sun gears;
- carrier coupler means for coupling with said bevel-meshing planetary gear, said carrier coupler means being fixedly coupled to said ring gear of said planar-meshing planetary gear system so as to be rotatable therewith; and
- a plurality of output shafts arranged concentrically with respect to one another, each of said output shafts being coupled to a respective one of said sun gear and said first and second bevel-meshing sun gears.

14. A plural output differential of the type having a single input shaft, the plural output differential comprising:
- a first epicyclic gear train stage having:
  - a first carrier arm,
  - a first planet gear mounted on said carrier arm,
  - a first sun gear for meshing with said first planet gear, said first sun gear having internal splines,
  - a first output shaft engaged with said internal splines of said first sun gear, and
  - a first ring gear for meshing with said first planet gear;
- means for coupling the single input shaft to said first carrier arm;
- a second epicyclic gear train stage having:
  - a second carrier arm,
  - a second planet gear mounted on said carrier arm, a second sun gear for meshing with said second planet gear, said second sun gear having internal splines, a second output shaft engaged with said internal splines of said second sun gear, and a second ring gear for meshing with said second planet gear;

means for coupling said first ring gear to said second carrier arm;

a third output shaft coupled to said second ring gear;

a carrier arrangement for rotating in response to said third output shaft;

a bevel-meshing differential drive arrangement rigidly coupled to said carrier arrangement, said bevel-meshing differential drive arrangement having:

first and second bevel planet gears contained within said carrier arrangement at diametrically opposite ends thereof and being revolvable in response to said rotation of said carrier arrangement; on an axis that is orthogonal to that of said first output shaft, first and second bevel sun gears each for meshing with said first and second bevel planet gears and arranged to be rotatable about an axis of rotation that is coaxial with that of the rotation of the carrier arrangement, and fourth and fifth output shafts engaged with respective ones of said first and second bevel sun gears; and coupler means for coupling said third output shaft and said carrier arrangement.

15. The plural output differential of claim 14, wherein there are further provided:

a first housing for accommodating said first and second epicyclic gear train stages; and a second housing for accommodating said bevel-meshing differential drive arrangement.

16. The plural output differential of claim 14, wherein said first housing is arranged to form first and second cavities substantially isolated from one another for accommodating respective ones of said first and second epicyclic gear train stages, there being further provided bearing means disposed intermediate of said first and second epicyclic gear train stages.

17. The plural output differential of claim 16, wherein said first housing is further arranged to form a third cavity for accommodating a meshed gear arrangement for transferring rotatory displacement from said third output shaft to said coupler means.

18. A differential drive arrangement having a rotatory input and n differentially related outputs, where n is an integer having a value $\geq 2$, the differential drive arrangement comprising:

n epicyclic planetary gear modules each having:
a sun gear,
a ring gear,
at least one planetary gear meshing with said sun and ring gears, and
a planetary carrier for supporting said planetary gear;

input coupling means for coupling to said planetary carrier of a first one of said n epicyclic planetary gear modules and forming the rotatory input;

n−1 intermodule couplers for interconnecting said n epicyclic planetary gear modules sequentially, said epicyclic planetary gear modules being coupled at a ring gear of a prior epicyclic planetary gear module to a planetary gear of a subsequent epicyclic planetary gear module; and n output shafts arranged concentrically with respect to one another, said output shafts each being respectively coupled to said sun gear of each of said epicyclic planetary gear modules.

19. A plural output differential arrangement of the type having a rotatory input, the plural output differential arrangement comprising:

a first planar-meshing planetary gear system having a first sun gear, a first ring gear, at least one first planetary gear meshing with said first sun and first ring gears, and a first planetary carrier for supporting said first planetary gear;

input coupling means for coupling said first planetary carrier to the rotary input;

a second planar-meshing planetary gear system having a second sun gear, a second ring gear, at least one second planetary gear meshing with said second sun and second ring gears, and a second planetary carrier for supporting said second planetary gear;

a first gear system coupler for coupling said first ring gear and said second planetary carrier;

first and second major bevel planet gears;

first and second minor bevel planet gears;

a carrier for holding said major and minor bevel planet gears in rotatable diametrical alignment, said first and second major bevel planet gears being disposed on opposite ends of said carrier, and said first and second minor bevel planet gears being disposed intermediate of said major bevel planet gears;

first and second major bevel sun gears arranged to mesh with said first and second major bevel planet gears;

first and second minor bevel sun gears arranged coaxially with respective ones of said major bevel sun gears and to mesh with said first and second minor bevel planet gears;

first and second minor output shafts, each being coupled to rotate with a respectively associated one of said first and second minor bevel sun gears;

first and second major output shafts, each being coupled to rotate with a respectively associated one of said first and second major bevel sun gears, said first minor and first major output shafts being coaxial and extending in a first direction, and said second minor and second major output shafts being coaxial and extending in a second direction; and means for coupling said second planetary carrier to said carrier for rotating said carrier in response to said rotatory input, said rotation of said carrier causing said major and minor bevel planet gears to revolve around said major and minor sun gears.

* * * * *